(12) United States Patent
Herz et al.

(10) Patent No.: US 8,280,864 B1
(45) Date of Patent: Oct. 2, 2012

(54) SYSTEM, METHOD, AND COMPUTER PROGRAM PRODUCT FOR RETRIEVING PRESENTATION SETTINGS FROM A DATABASE

(75) Inventors: William S. Herz, Hayward, CA (US); Alexander E. Soohoo, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 331 days.

(21) Appl. No.: 11/958,266

(22) Filed: Dec. 17, 2007

(51) Int. Cl.
G06F 7/00 (2006.01)
G06F 17/00 (2006.01)
G06F 17/30 (2006.01)
G06F 12/00 (2006.01)

(52) U.S. Cl. .................. 707/694; 707/776; 707/827
(58) Field of Classification Search .................. None
See application file for complete search history.

(56) References Cited

U.S. PATENT DOCUMENTS

| | | | | |
|---|---|---|---|---|
| 6,044,476 A * | 3/2000 | Ote et al. | | 714/31 |
| 6,314,479 B1 * | 11/2001 | Frederick et al. | | 710/63 |
| 6,646,653 B2 | 11/2003 | San et al. | | |
| 6,753,881 B1 * | 6/2004 | Callway et al. | | 345/699 |
| 6,768,519 B2 * | 7/2004 | Fujita et al. | | 348/705 |
| 6,847,358 B1 * | 1/2005 | Ford et al. | | 345/419 |
| 7,034,828 B1 | 4/2006 | Drebin et al. | | |
| 7,080,247 B2 * | 7/2006 | Rochford et al. | | 713/100 |
| 7,293,201 B2 * | 11/2007 | Ansari | | 714/38.14 |
| 7,603,445 B1 | 10/2009 | Fehrle | | |
| 7,626,944 B1 | 12/2009 | Riddle | | |
| 7,778,936 B2 * | 8/2010 | Adhikari | | 705/76 |
| 2001/0008021 A1 * | 7/2001 | Ote et al. | | 714/31 |
| 2002/0073415 A1 * | 6/2002 | Kim et al. | | 717/173 |
| 2002/0083228 A1 | 6/2002 | Chiloyan et al. | | |
| 2002/0095501 A1 * | 7/2002 | Chiloyan et al. | | 709/227 |
| 2004/0187103 A1 * | 9/2004 | Wickham et al. | | 717/168 |
| 2004/0212610 A1 * | 10/2004 | Hamlin | | 345/211 |
| 2005/0104888 A1 * | 5/2005 | Ford et al. | | 345/506 |
| 2005/0225639 A1 | 10/2005 | Somers | | |
| 2006/0132473 A1 * | 6/2006 | Fuller et al. | | 345/204 |
| 2007/0002347 A1 * | 1/2007 | Lai et al. | | 358/1.9 |
| 2007/0066403 A1 | 3/2007 | Conkwright | | |
| 2007/0098288 A1 | 5/2007 | Raskar et al. | | |
| 2007/0172140 A1 | 7/2007 | Kokemohr | | |
| 2007/0268204 A1 * | 11/2007 | Kawabe | | 345/24 |
| 2008/0005611 A1 * | 1/2008 | Solyanik | | 714/6 |
| 2008/0072077 A1 * | 3/2008 | Orr | | 713/194 |
| 2008/0102957 A1 | 5/2008 | Burman et al. | | |
| 2008/0133067 A1 | 6/2008 | DeMay | | |
| 2008/0270569 A1 * | 10/2008 | McBride et al. | | 709/217 |
| 2009/0115778 A1 * | 5/2009 | Ford et al. | | 345/419 |
| 2010/0269137 A1 * | 10/2010 | Nakajima et al. | | 725/39 |

OTHER PUBLICATIONS

U.S. Appl. No 12/001,669, filed Dec. 11, 2007.
Non-Final Office Action from U.S. Appl. No. 12/001,669, dated Feb. 17, 2011.
Lebaredian et al., U.S. Appl. No. 12/001,504, filed Dec. 11, 2007.

(Continued)

*Primary Examiner* — Pierre Vital
*Assistant Examiner* — Taelor Kim
(74) *Attorney, Agent, or Firm* — Zilka-Kotab, PC

(57) ABSTRACT

A system, method, and computer program product are provided for retrieving presentation settings from a database. In use, presentation capabilities information associated with media hardware is received. Further, a plurality of presentation settings is retrieved from a database, utilizing the presentation capabilities information.

15 Claims, 6 Drawing Sheets

OTHER PUBLICATIONS

Final Office Action from U.S. Appl. No. 12/001,669 dated Jul. 21, 2011.
Non-Final Office Action from U.S. Appl. No. 12/001,504 dated Aug. 5, 2011.
Advisory Action from U.S. Appl. No. 12/001,669, dated Oct. 14, 2011.
Final Office Action from U.S. Appl. No. 12/001,504, dated Feb. 7, 2012.
Notice of Allowance from U.S. Appl. No. 12/001,504, dated Jun. 7, 2012.
Non-Final Office Action from U.S. Appl. No. 12/001,669, dated May 11, 2012.

* cited by examiner

SYSTEM, METHOD, AND COMPUTER PROGRAM PRODUCT FOR RETRIEVING PRESENTATION SETTINGS FROM A DATABASE

FIELD OF THE INVENTION

The present invention relates to media systems, and more particularly to adjusting presentation settings.

BACKGROUND

Processors, in general, have become more and more adjustable in nature. Graphics processors are one example of processors which have exhibited this trend. Such adjustability has primarily been driven by an increase in the programmability of various aspects of such processors. Just by way of example, graphics processors are equipped with various programmable shaders which are capable of adjusting graphics processing based on various factors such as particulars of a specific application, physical attributes of an output device, etc.

For example, graphics processors currently query information regarding an output device (e.g. a display, etc.) for tailoring processing for such device. Such information is typically provided by extended display identification data (EDID) which is defined by the video electronics standards association (VESA). Such EDID typically includes basic information about an output display and its capabilities, including vendor information, maximum image size, color characteristics, factory pre-set timings, frequency range limits, character strings for the output display name, serial number, etc.

When a graphics processor is connected to a display (e.g. by connecting a graphics card to the display, etc.), a process known as "hot plug detection" occurs. During this event, the graphics processor solicits the EDID from the display and incorporates such data into an output default resolution selection properties and control panel. Such control panel typically presents the users with only display resolution controls that are within the dictated scope of the capabilities of the display, as indicated by the EDID.

Problems may arise during this process when a display manufacturer does not dictate the proper EDID timings, thus limiting the user experience to a subset of resolutions that the graphics processor is capable of outputting. There is thus a need for addressing these and/or other issues associated with the prior art.

SUMMARY

A system, method, and computer program product are provided for retrieving presentation settings from a database. In use, presentation capabilities information associated with media hardware is received. Further, a plurality of presentation settings is retrieved from a database, utilizing the presentation capabilities information.

DETAILED DESCRIPTION

Figure 1:
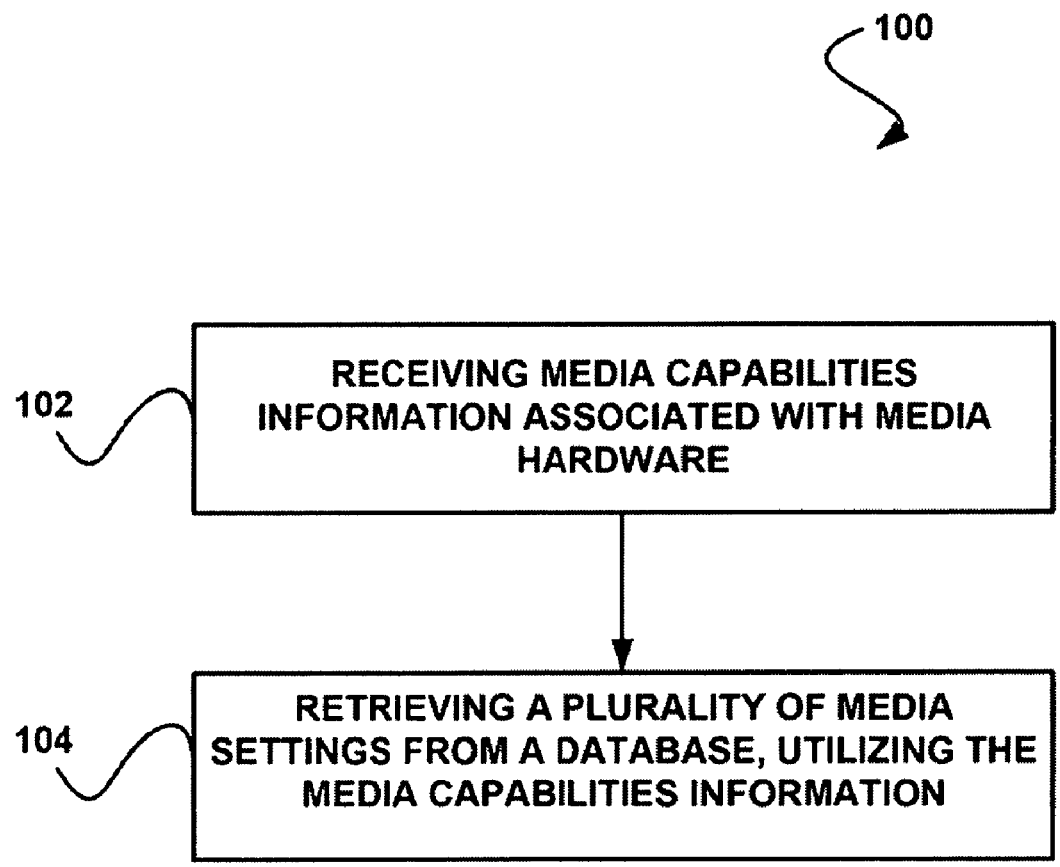
FIG. 1 shows a method for retrieving presentation settings from a database, in accordance with one embodiment.

FIG. 1 shows a method 100 for retrieving presentation settings from a database, in accordance with one embodiment. As shown in operation 102, presentation capabilities information associated with media hardware is received. In the context of the present description, the media hardware may include any hardware utilized for presenting, outputting, processing, etc. media (e.g. audio, video, graphics, etc.). Just by way of example, the media hardware may include audio hardware (e.g. audio/video receiver, speakers, etc.), a display, etc.

As an option, the media hardware may be controlled by a processor. Such processor may include a graphics processor, an audio processor, etc. Just by way of example, in the context of an embodiment where a graphics processor is utilized to control the media hardware, the graphics processor may include a graphics processing unit (GPU). More information regarding another exemplary programmable graphics processor and a related environment will be set forth in greater detail during reference to FIG. 6. On the other hand, in the context of an embodiment where an audio processor is utilized to control the media hardware, the audio processor may be provided in the form of an audio card, an embedded audio processor, etc. Of course, however, the processor may include any other integrated circuit equipped with processing capabilities [e.g. in the form of a chipset, system-on-chip (SOC), core integrated with a CPU, discrete processor, etc.].

Additionally, the presentation capabilities information may include any information indicating presentation capabilities associated with the media hardware. In one embodiment, the presentation capabilities information may include an identifier. Such identifier may optionally identify the media hardware (e.g. the name of the media hardware, the version of the media hardware, the manufacturer of the media hardware, a unique number associated with the media hardware, etc.). Thus, the identifier may include a display identifier, audio hardware identifier, etc.

In another embodiment, the presentation capabilities information may include extended display identification data (EDID). Such EDID may indicate display capabilities of a display, for example. Optionally, the EDID may include a data structure provided by the display to describe the display capabilities to a graphics processor.

Further, the presentation capabilities information may be received in any manner. In one embodiment, the presentation capabilities information may be received automatically. For example, the presentation capabilities information may be received in response to detection of the media hardware (e.g. hot plug detection, etc.). The media hardware may be detected upon establishing a connection between the media hardware and a system including the processor (e.g. computer system, etc.). In another embodiment, the presentation capabilities information may be received in response to a request by the processor for such presentation capabilities information.

In yet another embodiment, the presentation capabilities information may be received from the media hardware. Just by way of example, the presentation capabilities information may be received from the media hardware in response to the processor request for the presentation capabilities information. Further, the presentation capabilities information may be received by the processor (e.g. graphics processor, etc.).

Moreover, a plurality of presentation settings is retrieved from a database, utilizing the presentation capabilities information, as shown in operation 104. To this end, the database may include any data structure storing presentation settings. In one embodiment, the database may be local to the media hardware. For example, the database may be stored in memory associated with the media hardware.

In another embodiment, the database may be remotely located with respect to the media hardware. Such remote database may thus be coupled to the media hardware via a network, as an option. As another option, the remote database may be located on a server remotely located (e.g. over the network) with respect to the media hardware.

In the context of the present description, the presentation settings may include any settings (e.g. parameters, properties, values, etc.) capable of being retrieved utilizing the presentation capabilities information. In one embodiment, the presentation settings may be associated with the media hardware. For example, the presentation settings may be applied to the media hardware for configuring the media hardware. As an option, the presentation settings may configure a manner in which media is presented via the media hardware. In various embodiments, the presentation settings may include settings associated with a resolution, color depth, display timings, etc.

Still yet, the presentation settings may be retrieved from the database, utilizing the presentation capabilities information, in any manner. As an option, the database may be queried with the presentation capabilities information. Accordingly, the database may store different presentation settings particular to each of a plurality of different presentation capabilities information, in one embodiment.

As another option, the presentation settings may be retrieved by a processor, such as the processor that received the presentation capabilities information. For example the processor may issue a request for the presentation settings to the database. Optionally, the request may include the presentation capabilities information. Thus, the presentation settings may be retrieved remotely or locally, based on the location of the database. In this way, presentation settings may be retrieved from a database utilizing presentation capabilities information associated with media hardware.

In one embodiment, the presentation settings may be retrieved based on a user request including such presentation capabilities information. For example, the user may include a user of the media hardware. In another embodiment, the presentation settings may be retrieved based on an automatically generated request.

Further, the user request and/or automatically generated request may be issued in response to detection of the media hardware being at least in part non-functional (e.g. the display does not correctly display video and/or images, the audio hardware does not correctly output audio, etc.). As an option, the media hardware may be at least in part non-functional based on predefined presentation settings configured on the media hardware. Just by way of example, the media hardware may be preconfigured with presentation settings which result in the media hardware being at least in part non-functional. As another example, the media hardware may be preconfigured with presentation settings that are understated (e.g. do not utilize the full capabilities of the media hardware, etc.).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
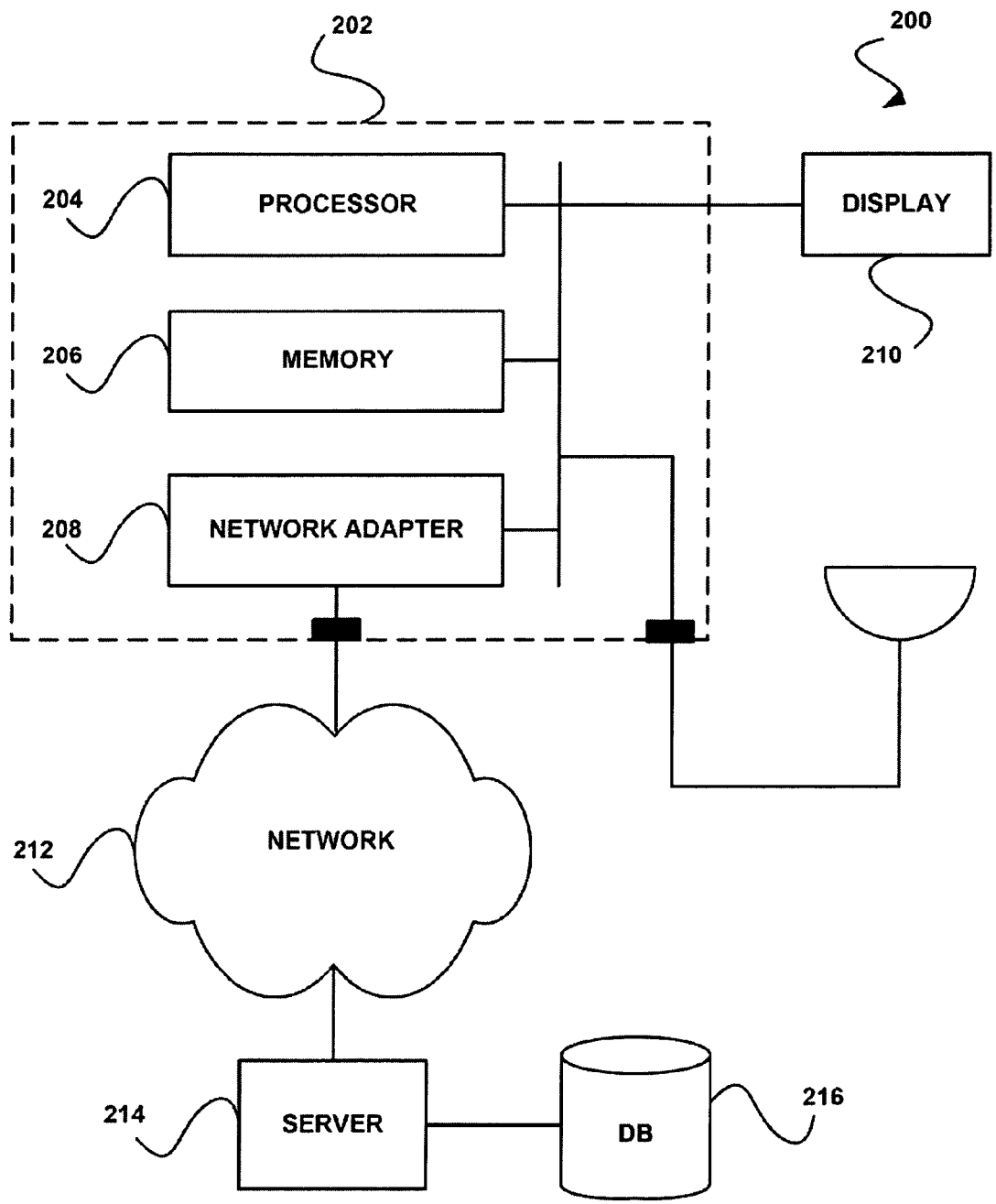
FIG. 2 shows a system for retrieving presentation settings from a database, in accordance with another embodiment.

FIG. 2 shows a system 200 for retrieving presentation settings from a database, in accordance with another embodiment. As an option, the present system 200 may be implemented to carry out the method 100 of FIG. 1. Of course, however, the system 200 may be implemented in any desired environment. It should also be noted that the aforementioned definitions may apply during the present description.

As shown, a device 202 is coupled to a display 210. In the context of the present embodiment, the device 202 may include a client computer, server computer, mobile device, etc. In addition, the display 210 may include a monitor or any other display device capable of displaying media (e.g. video, images, etc.). Optionally, the display 210 and the device 202 may be included in a single system.

As also shown, the device 202 includes a processor 204, memory 206 and a network adapter 208, but of course may also include any other desired components. The processor 204 may include a graphics processor, for example. Thus, the processor 204 may optionally be utilized for displaying media via the display 210.

In addition, the processor 204 may identify presentation capabilities information associated with the display 210. For example, upon a connection between the device 202 and the display 210 being established, the processor 204 may request the presentation capabilities information associated with the display 210 from the display 210 (e.g. via a query, etc.). For example, the presentation capabilities information may include properties of the display 210 (e.g. a maximum resolution, color depth, display timings, etc.), an identifier of the display 210 (e.g. EDID), etc.

The display 210 may send a response to the processor 204 including the presentation capabilities information. In one embodiment, the response may be sent though a serial bus, such as an inter-integrated circuit (I2C) bus. Of course, however, the response may be sent in any desired manner.

In response to receipt of the presentation capabilities information, the processor 204 may store the presentation capabilities information in memory 206 of the device 202. Additionally, the processor 204 may incorporate the presentation capabilities information in a control panel and output default resolution selection properties utilized by the processor 204. To this end, the processor 204 may attempt to utilize the presentation capabilities information in controlling the display 210 to display media.

As another option, the processor 204 may retrieve a plurality of presentation settings from a database 216, utilizing the presentation capabilities information associated with the display 210. In one embodiment, the processor 204 may retrieve the presentation settings if it is determined that use of the presentation capabilities information received from the display 210 results in the display 210 being at least in part non-functional. Such determination may be made manually by a user, or automatically utilizing the processor 204, for example. In this way, an action by the user and/or processor 204 (e.g. initiation of a presentation settings request, etc.) may be performed based on the determination of whether the presentation capabilities information received from the display 210 results in the display 210 being at least in part non-functional. Further, the presentation settings may be retrieved from the database 216 in response to such user action and/or processor 204 action.

As shown, the database 216 is remotely located with respect to the device 202. Thus, the processor 204 may retrieve the presentation settings stored in the database 216 via a network 212. In various embodiments, the network 212 may include the Internet, a local area network (LAN), a wide area network (WAN), etc.

For example, the processor 204 may communicate with a server 214 over the network 212 via a network adapter 208 of the device 202. Such communication may include a request for the presentation settings from the database 216. Furthermore, the request may include the presentation capabilities information associated with the display 210. To this end, the presentation settings may be retrieved from the database 216 based on sending the presentation capabilities information from the device 202 to the server 214 via the network 212. In one embodiment, the server 214 may utilize the presentation capabilities information for searching (e.g. querying) the database 216 for presentation settings particular to such presentation capabilities information. As an option, the database 216 may be included in the server 214.

Moreover, results of the query may be sent from the server 214 to the processor 204 of the device 202 via the network 212. For example, the results may be sent to the processor 204 as a response to the request sent from the processor 204. As another example, the results may be sent to the processor 204 with at least a portion of a driver (e.g. in the form of a driver update) capable of being installed on the device 202.

The processor 204 may further perform an action based on the results of the query (e.g. via the driver update, etc.). In one embodiment, the results may include a plurality of presentation settings particular to the display 210. For example, the server 214 may send the presentation settings particular to the display 210 if such presentation settings are found as result of a search of the database 216. Thus, the processor 204 may store the presentation settings in the memory 206. In addition, the processor 204 may incorporate the presentation capabilities information in a control panel and/or output default resolution selection properties utilized by the processor 204. To this end, the processor 204 may attempt to utilize the presentation settings in controlling the display 210 to display media.

In another embodiment, the results may include a null result indicating that the presentation settings were not found in the database 216 as a result of the search of the database 216. In response to receipt of a null result by the processor 204, the processor 204 may allow a user and/or administrator of the server 214 to manually adjust the presentation capabilities information stored in the control panel and/or output default resolution selection properties utilized by the processor 204. For example, the user may manually adjust the presentation capabilities information via a graphical user interface (GUI).

As another option, in response to receipt of a null result by the server 214, the server 214 may initiate a presentation setting optimization algorithm. In one embodiment, the presentation setting optimization algorithm may be performed at the server 214. In another embodiment, the presentation setting optimization algorithm may be performed at the device 202 (e.g. utilizing the processor 204).

The presentation setting optimization algorithm may search through all possible combinations of presentation settings (e.g. iteratively exhaust timing parameters, etc.) for identifying presentation settings (e.g. at least one set of presentation settings) that result in the display 210 being functional (e.g. that results in a locked/synchronized display). Optionally, during the search, a sensor may be utilized to identify the presentation settings that result in the display 210 being functional. For example, the sensor may include a visual and/or audio sensor for identifying the presentation settings that result in the display 210 being functional. Further, the sensor may be located on the display 210 and coupled to a universal serial bus port of the device 202.

If a plurality of sets of presentation settings are identified, each of which result in the display 210 being functional, one of the sets of presentation settings which result in optimal functionality of the display 210 (e.g. maximum resolution, maximum timing, etc.) may be tagged, as an option. As another option, at least some of the sets of presentation settings may be associated with a particular entity (e.g. person, organization, etc.) and/or purpose. For example, any of such sets of presentation settings may be advertised as being predetermined by an entity and/or predetermined for use with respect to a particular purpose (e.g. a particular movie, a particular type of media, etc.). In this way, one of the sets of presentation settings may be selected by a user of the device 202 based on the associated entity and/or purpose.

As yet another option, each of such sets of presentation settings associated with a particular entity and/or purpose may only be selectable after payment of a fee by the user. For example, sets of presentation settings predefined by particular entities and/or for particular purposes may each be assigned a price for use of such presentation settings. In this way, compensation may be provided for use of particular display settings in the form of a subscription-based service, or in conjunction with a warranty, etc.

Presentation settings identified via the presentation setting optimization algorithm and/or selected from a plurality of sets of presentation settings may be sent from the server 214 to the device 202, in one embodiment (e.g. if the presentation setting optimization algorithm is performed at the server 214). In another embodiment, any identified presentation settings may be stored in the memory 206 of the device 202. In yet another embodiment, the identified presentation settings may be stored in the database 216.

Furthermore, the processor 204 may use the identified presentation settings, such as the tagged optimal presentation settings, to automatically adjust the presentation capabilities information stored in the control panel and/or output default resolution selection properties. For example, the processor 204 may access and override preconfigured display settings associated with the display 210. In this way, presentation settings which result in the display 210 being functional and/or optimally functional may be applied to the display 210 via the processor 204.

Figure 3:
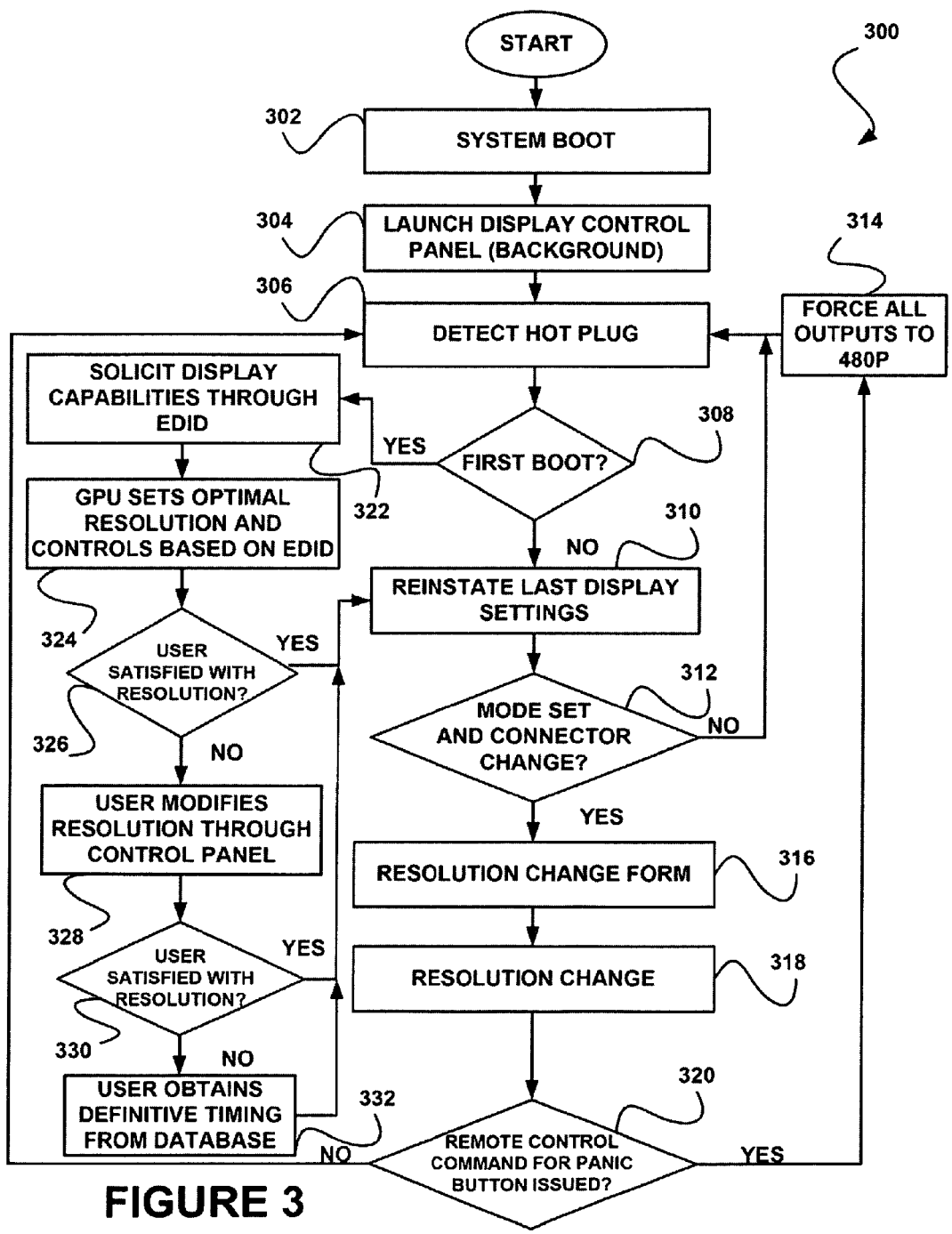
FIG. 3 shows a method for retrieving display settings from a database, in accordance with yet another embodiment.

FIG. 3 shows a method 300 for retrieving display settings from a database, in accordance with yet another embodiment. As an option, the method 300 may be carried out in the context of the functionality and architecture of FIGS. 1-2. Of course, however, the method 300 may be carried out in any desired environment. Again, it should be noted that the aforementioned definitions may apply during the present description.

As shown in operation 302, a system is booted. In the context of the present embodiment, the system may include any system that is in communication with display. For example, the system may include a computer. In one embodiment, booting the system may include powering the system.

Additionally, a display control panel is launched, as shown in operation 304. The display control panel may be launched via the system, for example. As another example, the display control panel may include a graphics control panel. In one embodiment, the display control panel may be automatically launched in response to the system boot. Optionally, the display control panel may be launched as a background task of the system.

Further, a hot plug associated with a display is detected, as shown in operation 306. Thus, a display connected to the system may be detected. Still yet, it is determined whether the system boot is a first boot, as shown in decision 308. For example, the system boot may be a first boot if the system has not previously been booted.

If it is determined that the system boot is a first boot, display capabilities are solicited through an EDID. Note operation 322. In the context of the present embodiment, the display capabilities may include capabilities of the display connected to the system. Optionally, soliciting the display capabilities through an EDID may include querying the display for the EDID associated with the display. Such EDID may indicate the display capabilities of the display, in one embodiment.

In response to receipt of the EDID, a GPU sets an optimal resolution and controls for the display based on the EDID, as shown in operation 324. For example, the EDID may indicate the optimal resolution and controls for the display. In one embodiment, the GPU may be included in the booted system. In another embodiment, the GPU may set the optimal resolution and controls for the display by configuring such optimal resolution and controls in the display control panel.

Still yet, it is determined whether a user of the system is satisfied with the resolution set for the display. Note decision 326. In one embodiment, the determination may be based on user input indicating whether the user is satisfied. For example, the user input may include opening a graphical user interface (GUI) (e.g. a control panel) capable of being used for modifying the resolution of the display, selecting an option indicating the user desires to modify the resolution, etc.

If it is determined that the user is not satisfied with the resolution set for the display, the user is allowed to modify the resolution of the display via the control panel. Note operation 328. The control panel may include a GUI capable of allowing the user to modify the resolution. In one embodiment, the user may manually input a desired resolution via at least one field of the control panel.

As shown in decision 330, it determined whether the user is satisfied with the modified resolution. Optionally, the determination may be based on user input indicating whether the user is satisfied. As similarly described above, the user input may include selecting an option indicating the user desires to modify the resolution, etc.

If it is determined that the user is not satisfied with the modified resolution, the user obtains definitive timing from a database, as shown in operation 332. For example, the definitive timing may include display timing associated with the display. The database may include a database local to the system associated with the display or remote with respect to such system. Further, the database may store definitive timings capable of being utilized by various displays.

Thus, in one embodiment, the user may obtain the definitive timing utilizing the EDID associated with the display. Just by way of example, the user may query the database utilizing the EDID. To this end, a definitive timing particular to the EDID may be obtained from the database.

In response to the user obtaining the definitive timing, or if it is determined in decision 308 that the system boot is not the first boot, or in decisions 326 or 328 that the user is not satisfied with the resolution of the display, last display settings of the display are reinstated. Note operation 310. The last display settings may include the display settings most recently set by the GPU. Further, the last display settings may be reinstated by selecting such last display settings.

In one embodiment, the last display settings may include the optimal resolution and controls set in operation 324. For example, the optimal resolution and controls set in operation 324 may be the last display settings if it is determined in decision 326 that the user is satisfied with such optimal resolution and controls. In another embodiment, the modified resolution input by the user in operation 330 may be the last display settings if it is determined decision 330 that the user is satisfied with such modified resolution. In yet another embodiment, the last display settings may include the display settings utilized by the GPU during a system boot previous to the system boot of operation 302.

Furthermore, it is determined whether a mode set and active connector have changed, as shown in decision 312. For example, the mode set and active connector may be changed by the GPU. Additionally, the mode set and active connector may be changed when the last display settings reinstated in operation 310 include display settings determined based on the user modification in operation 328 or the obtained display settings in operation 332. A change in the mode set and active connector may indicate that the display settings have been intentionally (e.g. by a user) selected.

If it is determined that the mode set and active connector have not changed, all outputs of the display are forced to a predetermined resolution. Note operation 314. The predetermined resolution may include a lowest resolution capable of being utilized by the display. As shown just by way of example, the predetermined resolution may include 480P.

If, however, it is determined that the mode set and active connector have changed, a resolution change form is submitted, as shown in operation 316. The resolution change form may be submitted via the control panel, in one embodiment. In another embodiment, the resolution change form may request the resolution of the display to be changed to the reinstated last display settings of operation 310.

Moreover, the resolution utilized by the display is changed, as shown in operation 318. In one embodiment, the resolution may be changed by configuring the display to utilize such resolution. In another embodiment, the resolution may be changed utilizing the GPU. In this way, the display may display media at the changed resolution.

Still yet, it is determined whether a remote control command for a resolution recovery button has been issued, as shown in decision 320. The remote control command may be issued by the user, for example. As another example, the remote control command may be issued in response to the user selecting the resolution recovery button via a GUI. Further, issuance of the remote control command may instruct the GPU to force all outputs of the display to the abovementioned predetermined resolution. Note operation 314. If, however, the remote control command is not issued, the method 300 returns to waiting until another hot plug associated with another display is detected (operation 306).

Figure 4:
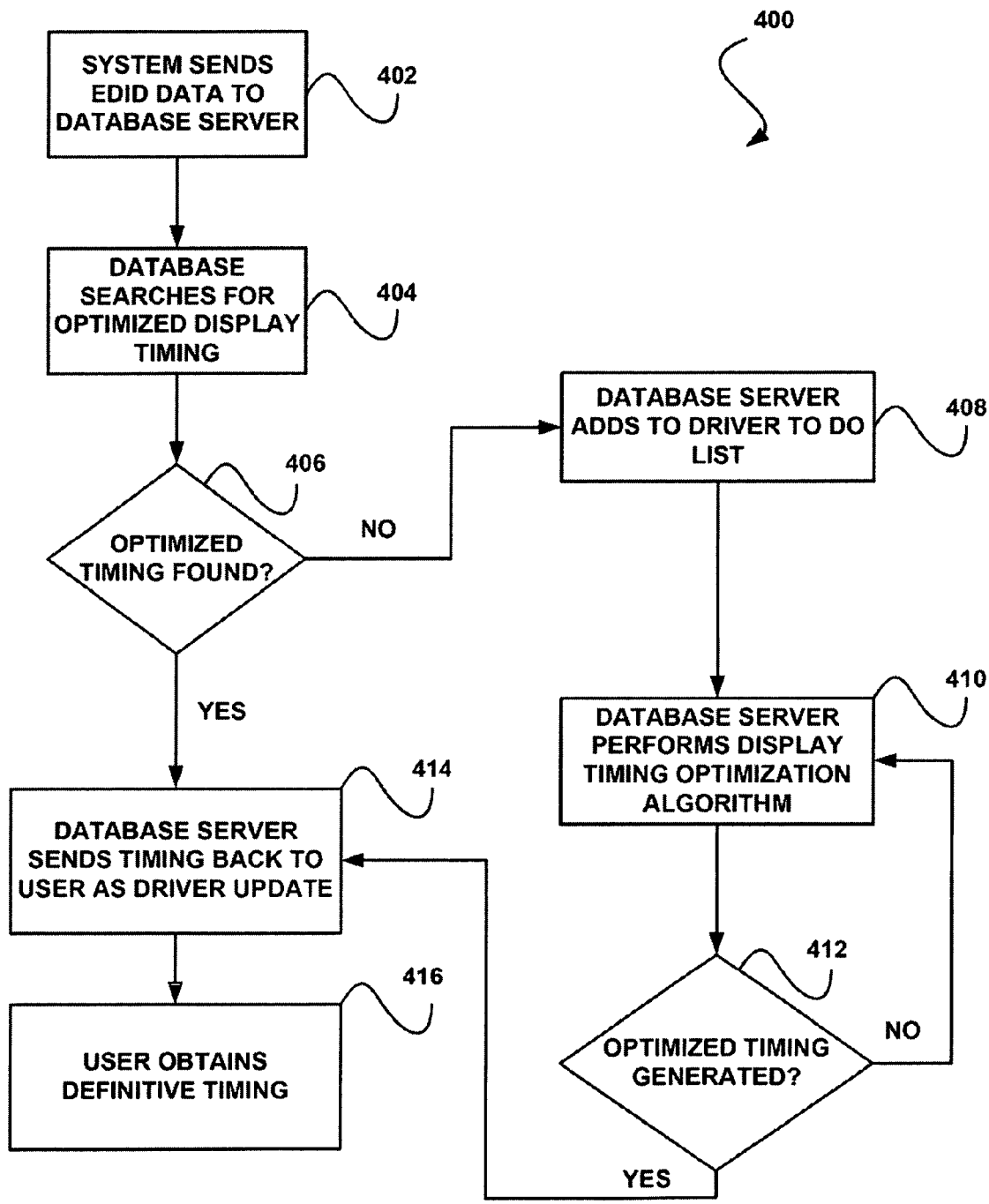
FIG. 4 shows a method for obtaining definitive timing for a display from a database, in accordance with still yet another embodiment.

FIG. 4 shows a method 400 for obtaining definitive timing for a display from a database, in accordance with still yet another embodiment. As an option, the method 400 may be carried out in the context of the functionality and architecture of FIGS. 1-3. For example, the method may be carried out in the context of operation 332 of FIG. 3. Of course, however, the method 400 may be carried out in any desired environment. Again, it should be noted that the aforementioned definitions may apply during the present description.

As shown in operation 402, a user sends EDID data to a database server. For example, the user may send the EDID data from a system including a display from which the EDID data was received. In one embodiment, the user may send the EDID data to the database server in response to a determination that display settings of the display result in the display being at least in part non-functional.

Additionally, a database on the server searches for an optimized display timing associated with the display, based on the EDID data, as shown in operation 404. For example, the server may query the database utilizing the EDID data. In this way, display settings stored in the database that are specific to the EDID data may be identified.

Further, it is determined whether an optimized timing has been found, as shown in decision 406. In the context of the present embodiment, the optimized timing may include any timing capable of being utilized by the display which results in the display being functional. Optionally, the determination may be made by querying the database for optimized timing utilizing the EDID. If the results of the query include a null result, it may be determined that an optimized timing has not been found. If, however, it is determined that the results of the query include at least one optimized timing, it may be determined that an optimized timing has been found.

In response to a determination that an optimized timing has not been found, the database server adds to a driver to do list. Note operation 408. The driver to do list may include a query indicating various EDIDs for which optimized timing has not been found in the database. Thus, the driver to do list may optionally indicate that an optimized timing algorithm is to be performed with respect to the EDID for generating optimized timing.

Accordingly, the optimized timing algorithm is performed, as shown in operation 410. In one embodiment, the optimized timing algorithm may be performed by the database server. In another embodiment, the optimized timing algorithm may be performed by the system from which the EDID was received.

Moreover, it is determined whether an optimized timing has been generated for the EDID. Note decision 412. For example, it may be determined whether the optimized timing algorithm has generated the optimized timing. Such determination may be periodically made during performance of the optimized timing algorithm. In this way, upon a determination that an optimized timing by the optimized timing algorithm has been generated, the server may send the optimized timing back to the user as a driver update, which may be incorporated into a local database. Note operation 414.

Similarly, if it is determined that the optimized timing is found in the database (decision 406), the server may send the found optimized timing back to the user as a driver update (operation 414). In this way, the user may obtain definitive timing based on the optimized timing sent from the server. Note operation 416. As another option, the server may also store any generated optimized timing in the database, such that any subsequent search for such optimized timing in the database may return the generated optimized timing.

Thus, in various embodiments, the optimized presentation settings may be generated in any of a variety of ways. For example, in one embodiment, artificial intelligence may be used to automatically generate the presentation settings locally or remotely. In another embodiment, the presentation setting generation workload may be distributed in the sense that they may be generated by a large customer base, whereby such settings may be received or retrieved for subsequent distribution as needed. In still yet another embodiment, the presentation settings may be manually generated by professionals capable of optimizing the settings.

Figure 5:
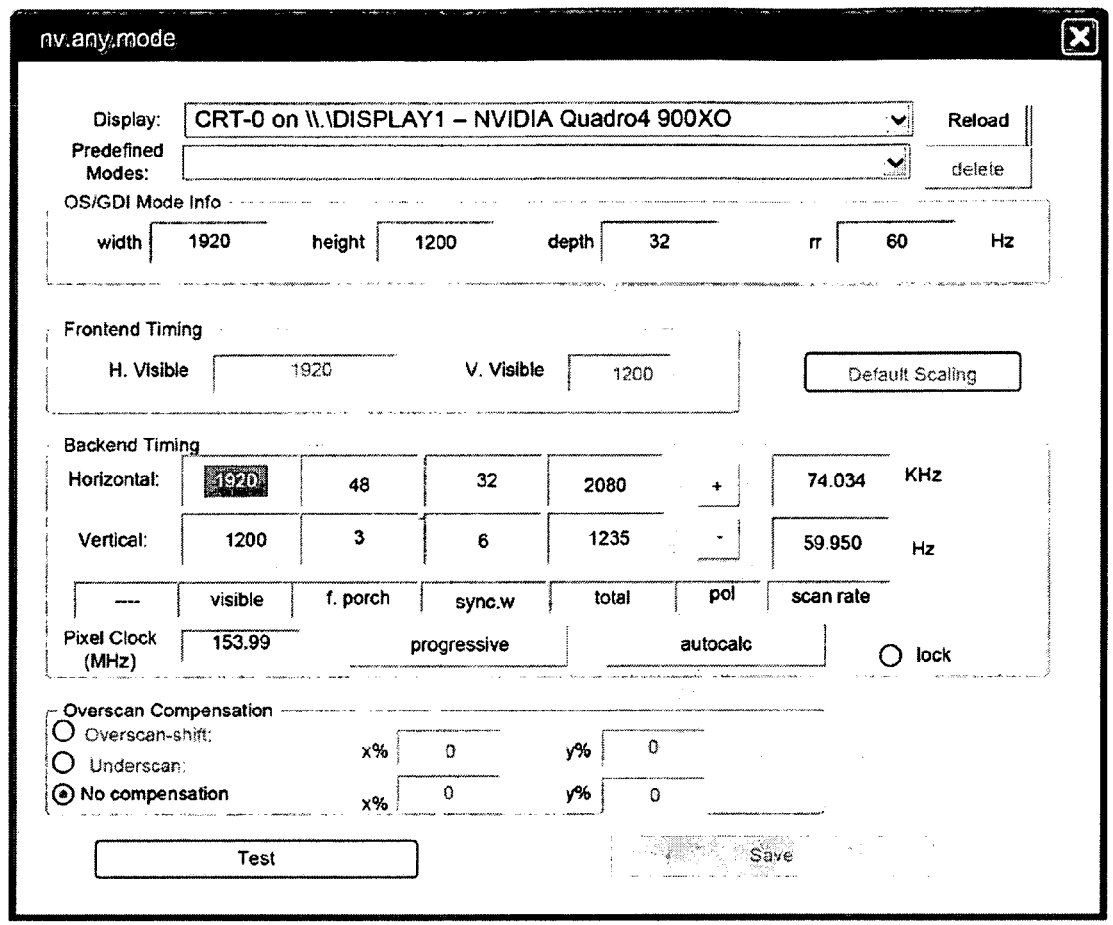
FIG. 5 shows a graphical user interface for inputting, testing and saving display timing parameters, in accordance with another embodiment.

FIG. 5 shows a graphical user interface (GUI) 500 for inputting, testing and saving display timing parameters, in accordance with another embodiment. As an option, the GUI 500 may be implemented in the context of the functionality and architecture of FIGS. 1-4. Of course, however, the GUI 500 may be implemented in any desired environment. Yet again, it should be noted that the aforementioned definitions may apply during the present description.

The GUI 500 may include a graphics control panel for configuring display settings of a display. As shown, the GUI 500 includes a plurality of input fields. Each input field may correspond to one of the display setting of the display. In this way, the input fields of the GUI 500 may be utilized by a user for manually modifying the display settings of the display.

In one embodiment, inputting a value into one of the input fields may result in automatic population of at least some of the other input fields with predetermined values. For example, inputting a value into one of the backend timing input fields may result in values in the other backend timing input field being automatically adjusted. Optionally, the other input fields may be populated with values that are valid with respect to the inputted value. Thus, only valid combinations of display setting values may be allowed. Such valid combinations may include combinations which provide functionality to the display.

In another embodiment, each input field of the GUI 500 may be manually modified as desired by a user. Once each input field has an associated value entered therein, the display settings indicated by the input fields may be tested. For example, the display settings may be tested in response to a user selecting a test option included in the GUI 500. Accordingly, the user may test various combinations of display settings for determining whether the display settings include a valid combination.

Figure 6:
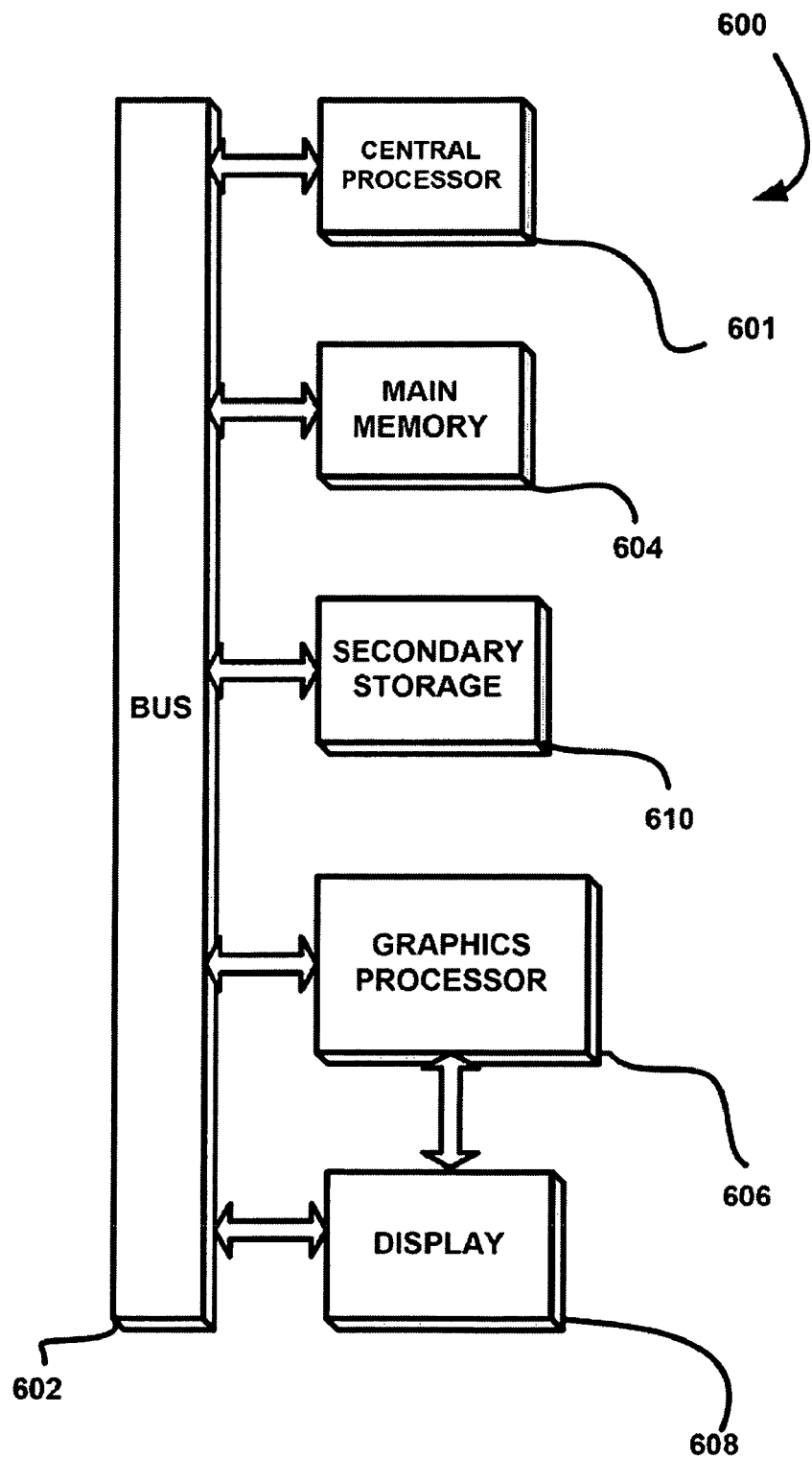
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to, a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, via a network and at a database server, presentation capabilities information associated with media hardware included in a system, the media hardware including a display;
   utilizing the database server, retrieving a plurality of presentation settings from a database by sending a query from the database server to the database, the query being based on the presentation capabilities information, wherein the presentation settings are retrieved from the database based on sending the presentation capabilities information from the system to the database server via the network, and wherein the presentation settings are searched for at the database, utilizing the presentation capabilities information;
   sending the presentation settings from the database server to the system for use by the system, the system including the media hardware, if the presentation settings are found as a result of the search; and
   initiating a presentation setting optimization algorithm, if the presentation settings are not found as a result of the search, wherein the presentation setting optimization algorithm searches through all possible combinations of presentation settings for the display, for identifying presentation settings that result in the display being functional, and wherein a sensor is utilized to identify the presentation settings that result in the display being functional, the sensor including one or more of a visual sensor and an audio sensor for identifying the presentation settings that result in the display being functional;
   wherein the query from the database server to the database includes a query for a timing capable of being used by the display which results in the display being functional.

2. The method of claim 1, wherein the media hardware includes audio hardware.

3. The method of claim 1, wherein the presentation capabilities information includes a display identifier.

4. The method of claim 1, wherein the presentation capabilities information includes extended display identification data (EDID).

5. The method of claim 1, wherein the presentation settings are retrieved from the database in response to a user action.

6. The method of claim 1, wherein the presentation setting optimization algorithm is performed at the database server.

7. The method of claim 1, wherein the presentation setting optimization algorithm is performed at the system.

8. The method of claim 1, wherein the presentation settings are received with at least a portion of a driver and stored locally.

9. The method of claim 1, wherein the receiving and the retrieving are performed by a graphics processor.

10. A computer program product embodied on a non-transitory computer readable medium, comprising:
    computer code for sending from a system, via a network and to a database server, presentation capabilities information associated with media hardware included in the system for being used to retrieve a plurality of presentation settings from a database by sending a query from the database server to the database, wherein the presentation settings are retrieved from the database based on sending the presentation capabilities information from the system to the database server via the network, and wherein the presentation settings are searched for at the database, utilizing the presentation capabilities information;
    computer code for receiving, at the system, the presentation settings from the database server, if the presentation settings are found as a result of the search;
    computer code for initiating a presentation setting optimization algorithm, if the presentation settings are not found as a result of the search, wherein the presentation setting optimization algorithm searches through all possible combinations of presentation settings for the display, for identifying presentation settings that result in the display being functional, and wherein a sensor is utilized to identify the presentation settings that result in the display being functional, the sensor including one or more of a visual sensor and an audio sensor for identifying the presentation settings that result in the display being functional;
    computer code for utilizing the presentation settings, by the system, in connection with the media hardware;
    wherein the media hardware includes a display;
    wherein the query from the database server to the database includes a query for a timing capable of being used by the display which results in the display being functional.

11. An apparatus, comprising:
    a hardware processor of a system for sending, via a network and to a database server, presentation capabilities information associated with media hardware included in the system; and
    a database server for retrieving a plurality of presentation settings from a database by sending a query to the database, the query being based on the presentation capabilities information, wherein the presentation settings are retrieved from the database based on sending the presentation capabilities information from the system to the database server via the network, and wherein the presentation settings are searched for at the database, utilizing the presentation capabilities information;
    wherein the apparatus is operable such that, if the presentation settings are found as a result of the search, the presentation settings are received at the system, from the database server, for utilizing the presentation settings, by the hardware processor of the system, in connection with the media hardware;

wherein the apparatus is operable such that, if the presentation settings are not found as a result of the search, a presentation setting optimization algorithm is initiated, wherein the presentation setting optimization algorithm searches through all possible combinations of presentation settings for the display, for identifying presentation settings that result in the display being functional, and wherein a sensor is utilized to identify the presentation settings that result in the display being functional, the sensor including one or more of a visual sensor and an audio sensor for identifying the presentation settings that result in the display being functional;

wherein the media hardware includes a display;

wherein the query from the database server to the database includes a query for a timing capable of being used by the display which results in the display being functional.

12. The apparatus of claim 11, wherein the hardware processor remains in communication with memory and a display via a bus.

13. The apparatus of claim 11, wherein the hardware processor includes a graphics processor.

14. The method of claim 12, wherein the database is coupled to the media hardware via the database server that is coupled to the network.

15. The method of claim 1, wherein a user is allowed to manually adjust the presentation capabilities information associated with the media hardware via a graphical user interface if the query from the database server to the database results in a receipt of a null result.

* * * * *